US008144590B2

(12) United States Patent
Broberg et al.

(10) Patent No.: US 8,144,590 B2
(45) Date of Patent: Mar. 27, 2012

(54) DISTRIBUTED RESOURCE ALLOCATION IN STREAM PROCESSING SYSTEMS

(75) Inventors: James Andrew Broberg, Ivanhoe East (AU); Zhen Liu, Tarrytown, NY (US); Honghui Xia, Briarcliff Manor, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 12/132,855

(22) Filed: Jun. 4, 2008

(65) Prior Publication Data

US 2008/0244072 A1    Oct. 2, 2008

Related U.S. Application Data

(63) Continuation of application No. 11/472,843, filed on Jun. 22, 2006.

(51) Int. Cl.
*G01R 31/08* (2006.01)

(52) U.S. Cl. .......................... 370/235; 370/252; 370/412

(58) Field of Classification Search .......... 370/250–253, 370/379, 231–238; 709/203, 226, 238
See application file for complete search history.

(56) References Cited

U.S. PATENT DOCUMENTS

| 5,648,969 | A  | * | 7/1997  | Pasternak et al. | 370/349 |
|-----------|----|---|---------|------------------|---------|
| 5,649,105 | A  | * | 7/1997  | Aldred et al.    | 709/220 |
| 6,466,978 | B1 | * | 10/2002 | Mukherjee et al. | 709/225 |
| 7,031,340 | B2 | * | 4/2006  | Sprague et al.   | 370/467 |
| 2006/0206857 | A1 | * | 9/2006 | Liu et al. | 717/104 |
| 2007/0115824 | A1 | * | 5/2007 | Chandra et al. | 370/235 |

FOREIGN PATENT DOCUMENTS

WO   WO2004/059928    *   7/2004

OTHER PUBLICATIONS

B. Awerbuch et al., "A Simple Local-Control Approximation Algorithm for Multicommodity Flow" Proc. of the 34th IEEE Symp. on Founations of Computer Science (FOCS), pp. 459-468; 1993.
B. Awerbuch et al., "Improved Approximation Algorithms for the Multi-Commodity Flow Problem and Local Competitive Routing in Dynamic Networks", Proc. of the 26th ACM Symp on Theory of Computing (STOC), pp. 487-496; 1994.
B. Awerbuch et al., "Anycasting in Adversarial Systems: Routing and Admission Control"ICALP; pp. 1153-1168, 2003.
U. Srivastava et al., :Operator Placement for In-Network Stream Query Processing Proc. of the 24th ACM SIGMOD-SIGACT-SIGART Symposium on Principles of database systems, pp. 250-258; 2005.
S. D. Viglas et al., "Rate-Based Query Optimization for Streaming Information Sources", ACM SIGMOD, 2002; 12 pages.
Fleischer, L. "Approximating Fractional Multicommodity Flows Independent of the Number of Commodities". SIAM Journal on Discrete Mathematics. vol. 13. 2000. pp. 1-16.

* cited by examiner

*Primary Examiner* — Pao Sinkantarakorn
*Assistant Examiner* — Iqbal Zaidi
(74) *Attorney, Agent, or Firm* — Tutunjian & Bitetto, P.C.; William J. Stock

(57) ABSTRACT

A system and method for resource allocation includes, in a network having nodes and links, injecting units of flow for at least one commodity at a source corresponding to the at least one commodity. At each node, queue heights, associated with the at least one commodity, are balanced for queues associated with each of one or more outgoing paths associated with that node. An amount of commodity flow is pushed across a link toward a sink, where the amount of commodity flow is constrained by a capacity constraint. Flow that reached the sink is absorbed by draining the queues.

18 Claims, 12 Drawing Sheets

DISTRIBUTED RESOURCE ALLOCATION IN STREAM PROCESSING SYSTEMS

RELATED APPLICATIONS INFORMATION

This application is a continuation of co-pending U.S. patent Ser. No. 11/472,843, filed Jun. 22, 2006, which is incorporated by reference herein in its entirety.

BACKGROUND

1. Technical Field

The present invention relates to resource allocation in distributed stream processing, and more particular to systems and methods for more efficiently allocating system resources in distributed networks or systems.

2. Description of the Related Art

The rapid development of computer technology has enabled streaming applications to emerge from many areas of the information technology (IT) industry. Examples of the broad application areas include network traffic monitoring, real-time financial data analysis, environmental sensing, surveillance, etc. In these applications, multiple data streams are generated by a large number of distributed sources, such as news and financial data feeds, monitoring sensors and surveillance video/audio sources. In order to provide valuable services to the users, these continuous streams of data need to pass through a series of sophisticated processing operations, including filtering, aggregation, and translation, etc.

Large distributed computer systems are often built to provide scalable processing services for the large amount of continuous data. The distributed stream processing systems, together with the data sources, and other shared resources, such as Internet hosts and edge servers, are connected by a network and collectively provide a rich set of processing services. The requirements to process large volumes of real-time data at high rates, and to effectively coordinate multiple servers in a distributed environment, have led to many great design challenges for efficient stream processing systems.

A fundamental problem in such stream-based processing networks is how to best utilize the available resources and coordinate seamlessly so that the overall system performance is optimized.

In most stream processing systems, applications are often running in a decentralized, distributed environment. At any given time, no server has the global information about all the servers in the system. It is thus difficult to determine the best resource allocation policy at each server in isolation, such that the overall throughput of the whole system is optimized. In addition to reaching the global optimal performance, the system needs to be able to adapt to the dynamically changing environment including input and resource consumption fluctuations. The system needs to coordinate the processing, communication, storage/buffering, and the input/output of neighboring servers to meet these challenging requirements.

Much stream processing related work has been done on data models and operators and efficient processing. While resource management has been noticed to be important to the performance, most work has focused on either heuristics for avoiding overload or simple schemes for load-shedding. The problem of dynamic load distribution and resource allocation has not yet been fully studied.

SUMMARY

The present embodiments consider a distributed resource allocation problem for a network of servers, constrained in both computing resources and link bandwidth. A model captures the shrinkage and expansion characteristics peculiar to stream processing, which generalizes the flow network. A novel expanded graph representation is provided that unifies the two types of resources seamlessly. The original problem is then mapped to a generalized multicommodity flow problem.

Three variations of the resource allocation problem are illustratively considered with distributed methods to solve the problems. The methods provide optimality in all three cases. An analysis on the complexity and how the methods adapt to dynamic changes are described. Numerical experiments were conducted to demonstrate that the distributed algorithms work well.

A method for resource allocation includes, in a network having nodes and links, injecting units of flow for at least one commodity at a source corresponding to the at least one commodity. At each node, queue heights, associated with the at least one commodity, are balanced for queues associated with each of one or more outgoing paths associated with that node. An amount of commodity flow is pushed across a link toward a sink, where the amount of commodity flow is constrained by a capacity constraint. Flow that reached the sink is absorbed by draining the queues.

In other embodiments, methods include determining a maximum concurrent flow rate for a plurality of commodities, by: initializing a maximum concurrent flow rate variable and an error tolerance value; performing the steps as recited in claim 1 until a number of iterations exceeds T or a queue threshold is exceeded due to the maximum concurrent flow rate variable; if T iterations have been exceeded without exceeding a queue threshold, increasing the maximum concurrent flow rate variable; and bisecting the maximum concurrent flow rate variable until a criterion is met to maximize concurrent flow rate. In still other embodiments, the method includes balancing all queue heights for the at least one commodity to equal heights and deleting any excess flow so that every queue in the node has a height of no more than a buffer size (H).

A resource allocation system includes at least one queue corresponding to one or more outgoing paths. An input path is configured to receive one or more commodities in a distributed network. A resource allocation program is configured to balance queue heights for flow units injected in the queues associated with the at least one commodity, and is further configured to push an amount of commodity flow across a link toward at least one sink. The amount of commodity flow is constrained by a capacity constraint.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
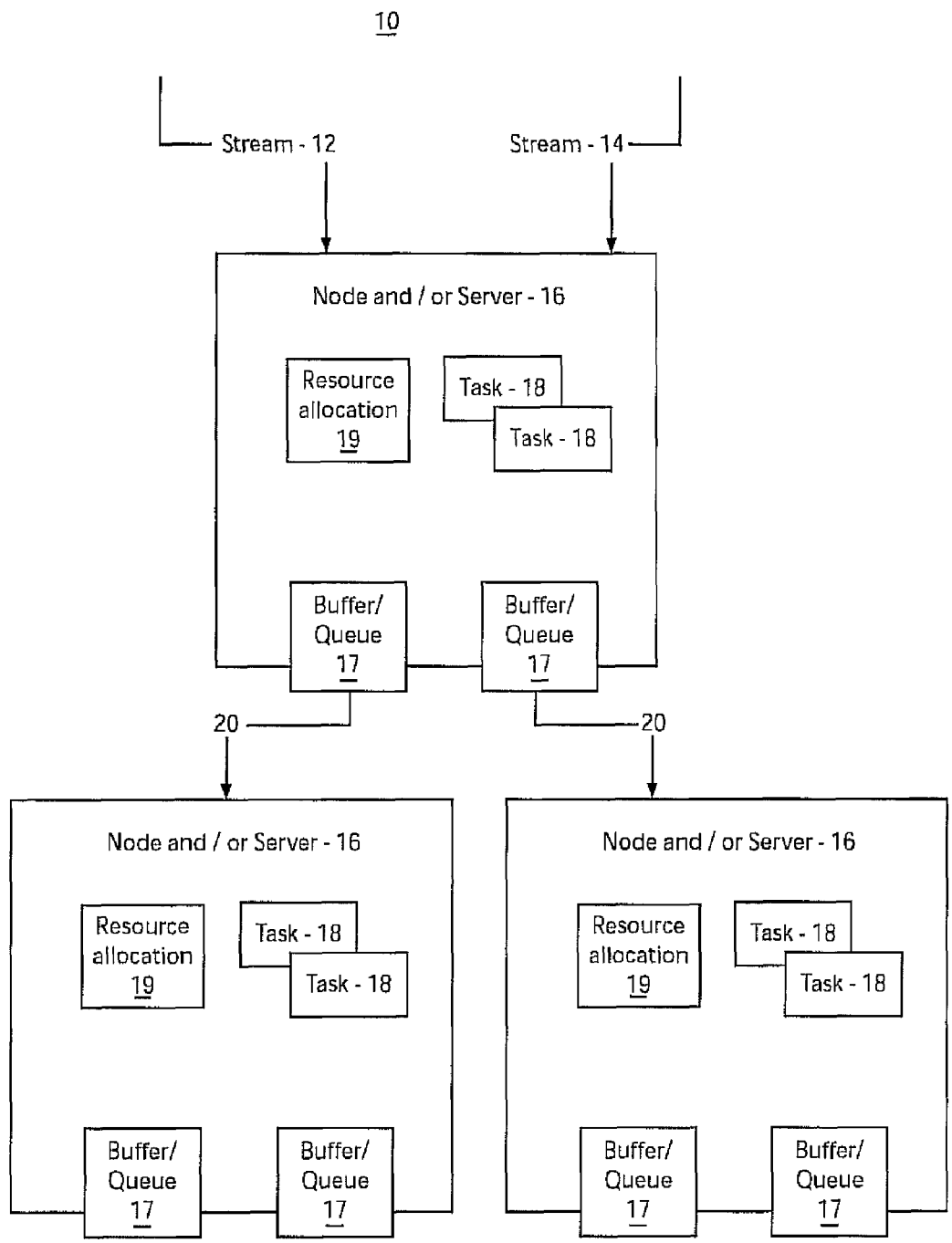
FIG. 1 is a block diagram of a network of nodes/servers configured to perform resource allocation in accordance with present principles.

Embodiments in accordance with present principles consider a distributed stream processing system which includes a network of cooperating servers, collectively providing processing services for multiple concurrent stream-based applications. Each application needs sophisticated processing of data streams from dispersed sources in a near real-time manner. The performance of such stream processing systems depends on an effective distribution of the available processing resources to the variety of data streams over the multiple, cooperating servers. Assuming all servers have finite computing resources and all communication links have finite available bandwidth, a generalized multi-commodity flow model is presented for the above-described allocation problem. Distributed methods are provided for finding the best resource allocation schemes in such stream processing networks.

Detailed performance analysis on the optimality and complexity of these methods are also provided. Numerical experiments are presented to demonstrate that these distributed algorithms work well.

In particularly useful embodiments, a distributed stream processing system is considered that includes a network of cooperating servers, collectively providing processing services for multiple data streams from geographically dispersed sources. In this illustrative system, each stream is needed to complete a series of tasks (operations) to become a finished product and leave the system. Each server is responsible for a subset of the tasks for possibly a subset of streams. It is possible for the size of the data streams to change after each operation. For example, a filtering operation may shrink the stream size dramatically, while a decryption operation may expand the stream size.

The traditional flow balancing properties no longer hold due to the shrinkage and expansion effects. This makes a corresponding flow network in accordance with present principles different from the conventional flow network. All servers are assumed to have finite computing resources and all communication links are assumed to have finite available bandwidth. This is to simplify the problem to demonstrate the present principles.

Each server operates independently of other servers except for communicating with its neighbors to transmit finished data streams. The present disclosure aims to find distributed schemes to allocate the computing resources as well as the communication bandwidth for the multiple streams and multiple servers so as to maximize the overall throughput for the whole system.

In particularly useful embodiments, three variations of the resource allocation problem are considered. The feasibility problem answers the question of whether the system has enough capacity to process the incoming streams at a given set of input rates. The maximum concurrent flow problem seeks to achieve a maximum proportional throughput for all output streams. The maximum weighted flow problem obtains the best allocation of the resources so that the total value of the output streams is maximized, where associated with each stream, there is a given weight to represent the value of return for every unit of successively delivered output. These three related problems are solved based on a distributed algorithm with customized features to address the slightly different objectives.

The method in accordance with present principles is based on setting up buffers and using back-pressure governed by potential functions to move flows across various servers and communication links. The analysis is provided for the optimality and complexity of the algorithms. Experimental results are then presented to demonstrate the performance of the algorithms as the network size scales up.

The problem can be described as a generalization of the traditional multicommodity flow problem. Multicommodity flow problems have been studied extensively in the context of conventional flow networks. The traditional multicommodity flow problem looks for the best way of using the link capacities to deliver the maximum throughput for the flows in the whole network. In addition to the link bandwidth constraints, the present principles include processing power constraints for each server. Furthermore, the traditional flow balancing is generalized in the presently addressed problem so as to allow flow shrinkage or expansion. The existing distributed algorithms are extended for the multicommodity problem to account for these differences and prove the same kind of convergence and complexity results.

Embodiments of the present invention can take the form of an entirely hardware embodiment, an entirely software embodiment or an embodiment including both hardware and software elements. In a preferred embodiment, the present invention is preferably implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a resource allocation system 10 in a distributed environment is illustratively shown. System 10 includes nodes/servers 16. Each node 16 may include a plurality of queues or buffers 17 corresponding to one or more outgoing paths from the node 16. An input path is configured to receive one or more commodities or streams 12 and 14 in the distributed network. A resource allocation program 19 is configured to balance queue heights (buffers capacities) for flow units injected in the queues associated with the at least one commodity or stream. The resource allocation program 19 provides the ability to allocate the outgoing information in a way that optimizes information flow through the network. For example, resource allocation program 19 executes methods 1, 2 and 3 (e.g., to solve for feasibility, maximum flow and/or weighted maximum flow or other methods) as will be described in greater detail below.

Resource allocation program 19 pushes an amount of commodity flow across a link toward at least one sink, where the amount of commodity flow is constrained by a capacity constraint, such as bandwidth of the links or capacity of the node/server. The buffers/queues 17 use back-pressure governed by potential functions to move flows across various servers and communication links. For example, the resource allocation program 19 includes a potential function which determines adjustments to the queue heights for reducing a total potential for all queues. The resource allocation program 19 may further include a reverse water filling method to identify a threshold for balancing the queue heights in accordance with the capacity constraint.

One aspect of the present system 10 includes that the node 16 allocates resources through itself without awareness of resource allocation information of other nodes. In one embodiment, all that is needed from other nodes is an awareness of buffer sizes of neighboring nodes.

A distributed stream processing environment is considered with dispersed data sources that provide high-volume data streams 12 and 14 to be consumed by multiple applications (tasks) in real time. The system 10 may include a large number of servers 16, capable of executing multiple stream-oriented programs/tasks 18. These servers 16 are possibly geographically distributed, and are connected through communication links 20. Each server 16 only has knowledge about its neighboring servers 16. All of these servers 16 collectively provide processing services for multiple concurrent stream-based applications.

It is assumed that each data stream 12 and 14 needs to be processed according to a given sequence of tasks 18, which are already pre-loaded onto various servers. Different servers 16 may be responsible for a different set of tasks (possibly overlapping) based on different platform requirements and other physical constraints. Multiple tasks residing on the same server can be executed in parallel and share the computing resource. It is the system's decision to invoke different servers for different streams and to allocate resources accordingly.

Besides being limited in computing resources at each server 16, the system 10 is also constrained in communication bandwidth on all the links. Multiple outgoing (processed) flows sharing the same physical link will compete for the finite communication bandwidth. Hence, each server 16 is faced with two decisions: first, it has to decide the allocation of its computing resource to multiple processing tasks; second, it has to decide how to share the bandwidth on each output link among the multiple flows going through.

The overall system 10 throughput depends on the coordination of processing, communication, buffering/storage, and input and output of various interconnected servers. In addition, such coordination/allocation schemes have to be distributed and be adaptive to the dynamically changing network environment. Two types of graphs may be employed to describe the logical and physical relationships between the streams, the processing tasks and the servers.

Figure 2:
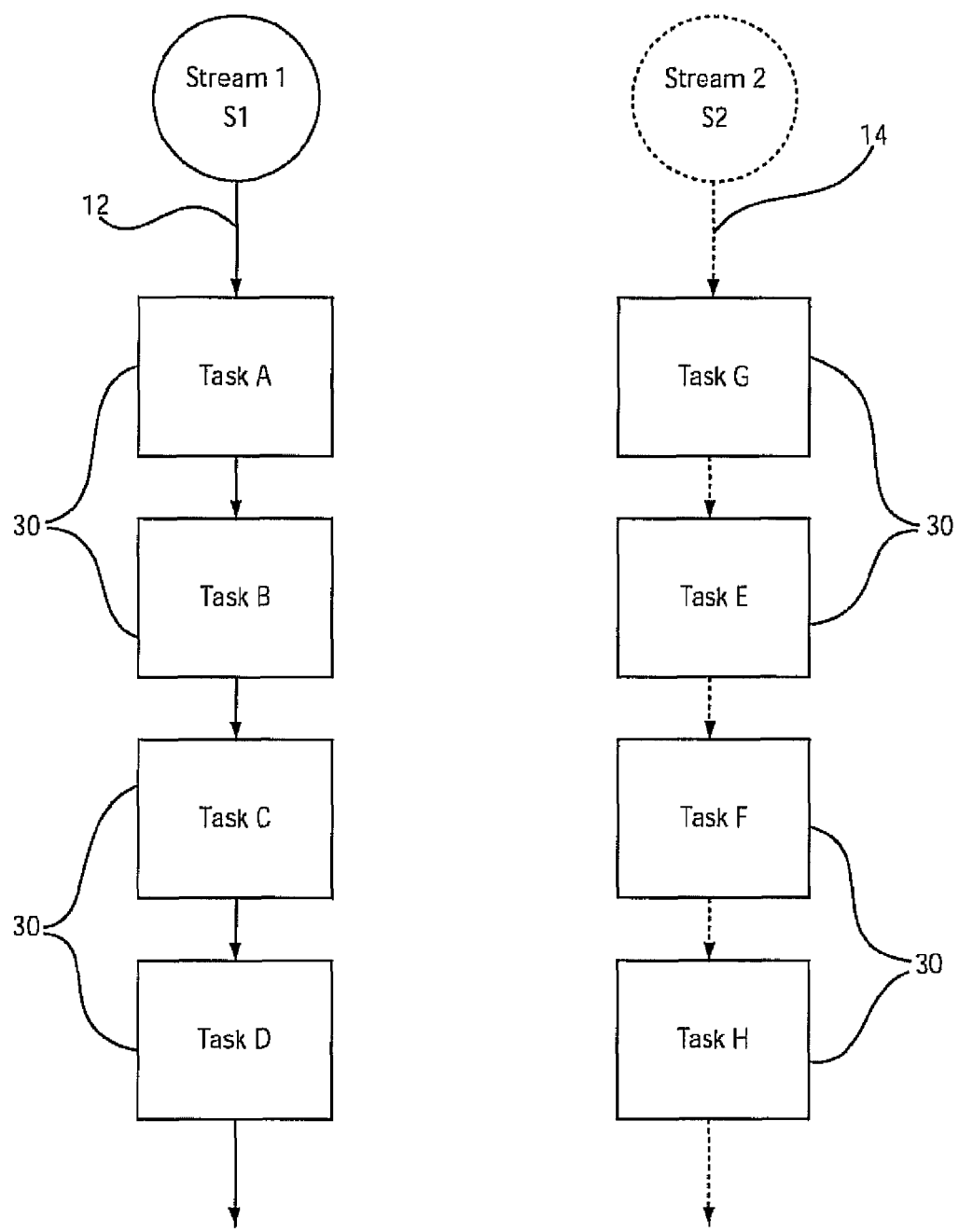
FIG. 2 is a block diagram showing a task graph in accordance with present principles.

Referring to FIG. 2, a task sequence graph is depicted and describes logical relationships among the processing tasks 30 for each data stream S1 and S2 in this example. The processing for each data stream (12 and 14) includes a series of tasks 30 (labeled A-H). Stream S1 needs processing of task A, followed by tasks B, C, D. Stream S2 needs processing of task C, followed by tasks E, F and H.

Figure 3:
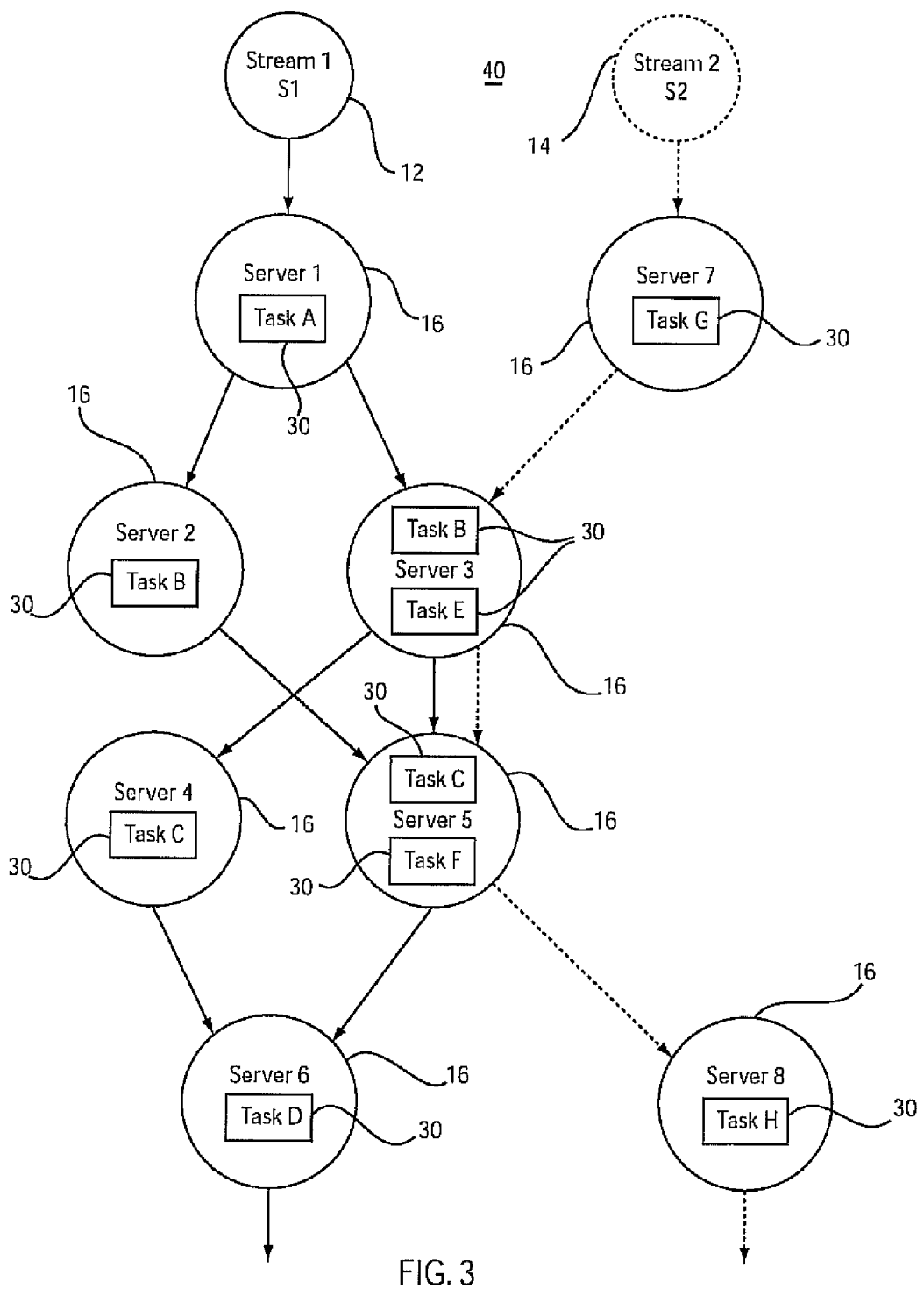
FIG. 3 is a block diagram showing a physical server graph in accordance with present principles.

Referring to FIG. 3, a physical server graph is used to describe the relationship among physical servers 16 and communication links 20 based on the task sequence graph of FIG. 2. Each server 16 is assigned to process one task 30 for each data stream 12 and 14. Notice that a task 30 may be assigned to multiple servers 16, and tasks 30 that belong to different streams 12 and 14 may be assigned to the same server 16. The placement of the various tasks 30 onto a physical network 40 may be handled using known techniques. For purposes of this disclosure, it is assumed that the task to physical server assignment is given.

It is reasonable to assume that on a given server 16, each task 30 corresponds to a different stream 12 or 14. E.g., if tasks A and C are both assigned to server 1, task B will be assigned to server 1 so as to save communication bandwidth. A task sequence graph of a stream can then be mapped to a directed acyclic sub-graph in the physical server graph. For example, suppose there are eight servers 16 (labeled servers 1-8 in FIG. 3), with server 1 assigned for task A, server 2 for task B, server 3 for tasks B and E, server 4 for task C, server 5 for tasks C and F, server 6 for task D, server 7 for task G, and server 8 for task H. Then, the directed acyclic sub-graph of the physical network of FIG. 3 shows tasks 30 which are represented by rectangles and servers 16 by circles. The sub-graph composed of solid links corresponds to stream S1 (12) and the sub-graph composed of dashed links corresponds to stream S2 (14). It is easily verified that the sub-graphs corresponding to individual streams are directed acyclic graphs.

The above physical network in FIG. 3 can he represented by a generic graph G=(N, E). Set N includes source nodes, sink nodes and processing nodes. Directed edges represent possible information flow between various nodes. The source nodes correspond to the source of the input data streams.

These nodes only have edges going out, and do not have any edges between them. The sink nodes correspond to the receivers of the eventual processed information. These nodes only have edges going to them, and do not have any edges in between. These different types of eventual processed information may be referred to as commodities. The commodities correspond to different types of services or products provided by the multiple concurrent applications on the system.

Assume that there are K different types of commodities, each associated with a unique sink node $t^k$, k=1, ..., K. Processing nodes stand for the various processing servers. They have both incoming and outgoing edges. An edge (u, v)∈ε for server v indicates that there should be a task residing on server v that can handle data output from node u. For a given node u, denote I(u) the set of all predecessor nodes of node u, and O(u) the set of all successor nodes of node u.

Without loss of generality, it can be assumed that each source node produces a single stream as the input to some processing node, and there is exactly one output stream leading to each sink node. Graph G is assumed to be connected. Each processing node u has available computing resource $R_u$ (≦∞). Each pair {u, v} of connected nodes has a finite bandwidth $B_{uv}$ available for communication.

Quantitative relationships will now be described between the input, output and resource consumption. Assume that the processing of one commodity stream is independent of the processing of other commodities, although the processing streams may share some common computing/communication resources. Also assume that it takes computing resource $r_{u,v}^k$ for node u∈N to process 1 unit of commodity k flow for downstream node v with v∈O(u). Each unit of commodity k input will result in $\beta_{u,v}^k$(>0) units of output after processing. This β parameter only depends on the task being executed for its corresponding stream. For example in FIG. 3, the fact that task B of stream 1 can be executed on both server 2 and server 3 indicates:

$$\beta_{2,5}^1 = \beta_{3,5}^1 = \beta_{2,4}^1 = \beta_{3,4}^1.$$

The parameter $\beta_{u,v}^k$ will be referred to as an expansion factor, which represents the expansion (or shrinking) effect in stream processing. For example, a decryption task may have a large expansion effect with $\beta_{u,v}^k$>1, while a filtering task may have a shrinking effect with $\beta_{u,v}^k$<1. Thus, flow conservation does not hold in the processing stage. However, flow is conserved while being transferred across an edge. Transferring a unit of flow across an edge needs one unit of bandwidth.

Without loss of generality, assume each server 16 can produce output flows for all downstream servers 16 from its incoming flows. In case one type of commodity k flow does not go to a downstream server v from server u, simply set $r_{u,v}^k$=+∞, $\beta_{u,v}^k$=1. Consider the example in FIG. 3, the fact that server 3 cannot send stream 2 to server 4 is equivalent to setting $r_{3,4}^k$=+∞, $\beta_{u,v}^k$=1 such that server 3 will take an infinite amount of resources to process flow for server 4.

It is possible for a stream to travel along different paths to reach the sink. The resulting outcome does not depend on the processing path in the physical network. However, the resource consumption can be different along different paths. Part of the problem is to determine the most efficient ways to utilize the resources. This leads to the following properties on the β parameters.

Property 1: For any two distinct paths p=($n_0, n_1, ..., n_l$) and p'=($n_0', n_1', ..., n_{l'}'$) that have the same starting and ending points, i.e. $n_0=n_0'$ and $n_l=n_{l'}'$, we have:

$$\prod_{i=0}^{l-1} \beta_{n_i,n_{i+1}}^k = \prod_{i=0}^{l'-1} \beta_{n_i',n_{i+1}'}^k,$$

for any commodity k that satisfies:

$$\sum_{i=0}^{l-1} r_{n_i,n_{i+1}}^k < +\infty, \text{ and}$$

$$\sum_{i=0}^{l'} r_{n_i',n_{i+1}'}^k < +\infty.$$

That is, no matter which path it takes, a successful delivery of f amount of commodity k flow from source $s^k$ to node n will result in the same amount $g_n^k f$ of output at node n, where $g_n^k$ is the product of the $\beta_{u,v}^k$'s along any path from $s^k$ to n. Clearly, $g_{s_k}^k$=1. For simplicity, denote $g^k=g_{t_k}^k$.

Each unit of commodity k that successfully reached the sink node $t^k$ is awarded a benefit amount of $w_k$. One goal is to find the optimal or close to optimal schemes to distribute the processing of the variety of data streams over the multiple, cooperating servers subject to finite computing resource and communication bandwidth so as to maximize the total value for all commodities. There are many different metrics to measure the value, e.g., throughput, loss, delay, etc. The metrics considered herein are preferably a function of the throughput of the output streams, however of criteria may be employed within the present principles.

For the problem to make intuitive sense, assume all the parameters R,B,r,β and w to be positive. In general, quantities $\beta_{u,v}^k$, although measurable, are not deterministic. The $\beta_{u,v}^k$ quantities may depend on the input data. Unless specifically stated otherwise, assume that this dependence is stationary, and that the quantities $\beta_{u,v}^k$ are defined as the average production rates. Distributed solutions capable of adapting to or absorbing local changes are sought in production rates and in network conditions.

Figure 4:
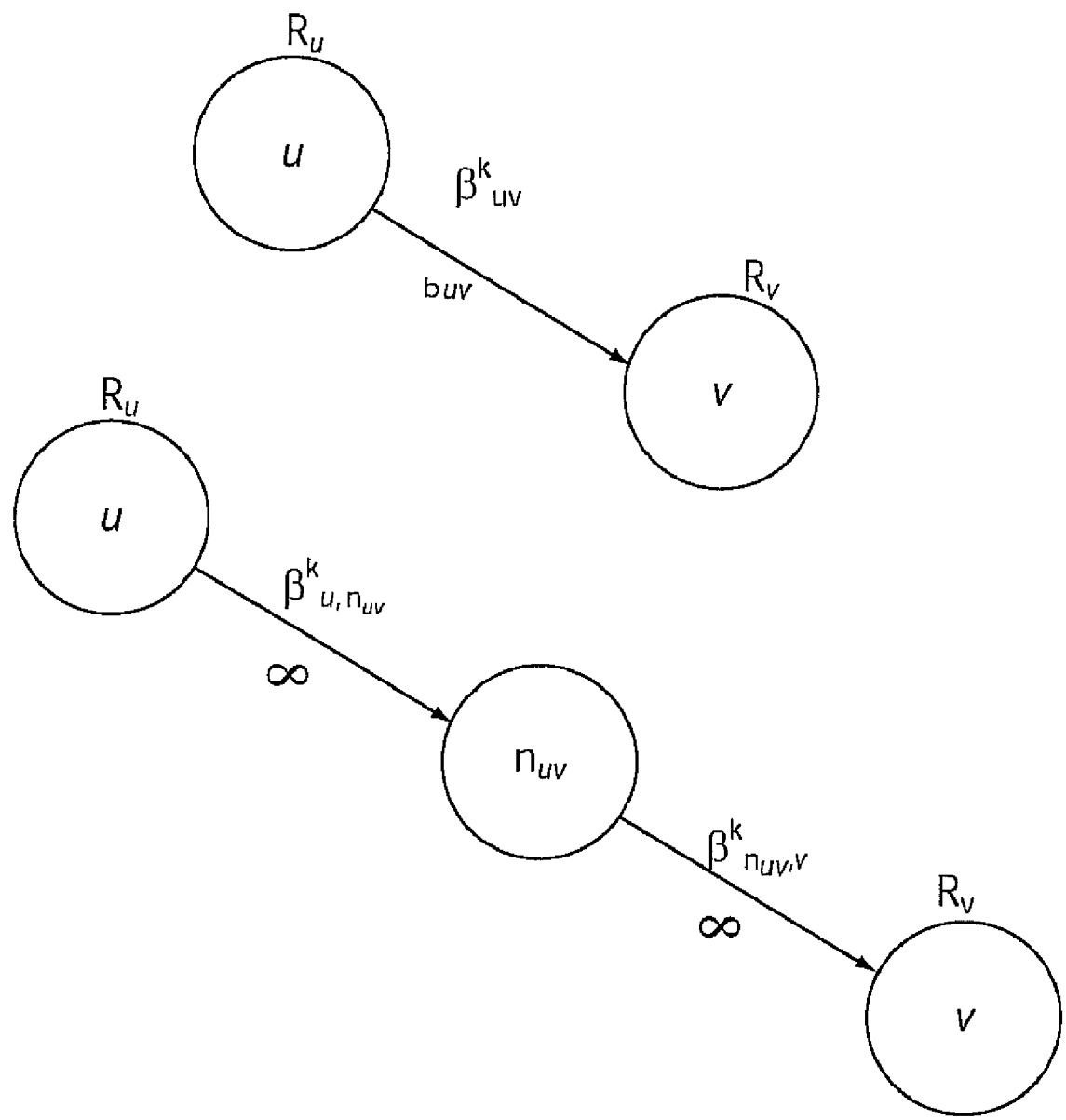
FIG. 4 is an expanded graph representation to demonstrate a problem solved in accordance with present principles.

Referring to FIG. 4, an extended graph representation and multicommodity model will now be described. An expanded graph representation is provided in FIG. 4 to further illustrate graphically the fact that a processing stage is separate from a flow transfer stage. A bandwidth node is introduced, denoted as $n_{uv}$, for each pair of servers u and v that are connected (i.e. either (u, v)∈ε, or (v, u)∈ε or both). If previously (u,v)∈ε, then in the new graph, there is a directed edge (u, $n_{uv}$) from u to $n_{uv}$, and a directed edge ($n_{uv}$,v) from $n_{uv}$ to v. The role of the bandwidth node $n_{uv}$ is to transfer flows.

Assume that each bandwidth node has total 'virtual computing' resource $R_{n_{uv}} = B_{u,v}$. The virtual computing corresponds to the transfer of the actual flow. Each unit of flow consumes one unit of bandwidth, and will become one unit of flow for the downstream node. In other words, $\beta_{u,n_{uv},v}^k$=1, $r_{n_{uv},v}^k$=1. Edges and parameters can be added similarly if (u, v)∈ε. For a processing node u∈N, and commodity k, with resource $r_{u,u_{uv}}^k = r_{u,v}^k$, node u can process 1 unit of commodity k flow and produce $\beta_{u,n_{uv}}^k = \beta_{u,v}^k$ unit of commodity k output to node $n_{uv}$.

Therefore a new (expanded) graph representation, denoted as G'=(N',ϵ') is provided in FIG. 4, where N' includes two sets of nodes, processing nodes in N and bandwidth nodes in $N_B$. ϵ' includes two sets of edges, edges from processing nodes to bandwidth nodes and edges from bandwidth nodes to processing nodes. Clearly, after the expansion, an original graph with N nodes, M edges and K commodities would result in a new graph G' with N+M nodes, 2M edges and K commodities.

Denote I'(n) the set of all predecessor nodes and O'(n) the set of all successor nodes of node n∈G'. For either processing nodes or bandwidth nodes, processing 1 unit of commodity k flow for edge (n/n')∈G' means pushing 1 unit of flow across edge (n, n'). However, after crossing the edge, the flow will result in $\beta_{u,n'}^k$ units of flow at node n' due to the expansion factor $\beta_{u,n'}^k$.

The new system, represented by graph G' in FIG. 4, is then faced with a unified problem (multicommodity flow problem): finding efficient ways of shipping all K commodity flows to their respective destinations subject to the resource constraint at each node. The new graph G' of FIG. 4 will be referred to hereinafter.

Static Problem Formulation: The problem described above can be viewed as a multicommodity flow problem. The traditional multicommodity flow problem consists of shipping several different commodities from their respective sources to their sinks through a common network so that the total flow going through each edge does not exceed its capacity. Associated with each commodity is a demand, which is the amount of that commodity that we wish to ship through the network. The problem comes in several verities. In the first, it would desirable to know if there is a feasible flow, i.e. a way of shipping the commodities that satisfies the demands. It would desirable to know the maximum value z such that z percent of each demand can be satisfied. This is called the maximum concurrent flow problem. Lastly, known as the maximum multicommodity flow problem, maximize the total flow over all commodities.

In present examples, the capacity constraints are on the nodes instead of edges. That is, the present embodiments are interested in efficient ways of shipping the multicommodity flows to their respective destinations subject to the node resource constraints. Also notice that traditional multicommodity flow problems assume flow conservation. This assumption no longer holds in the context of stream processing networks. In present embodiments, a unit of commodity k flows at node n, and once across edge (n,n') in graph G', will become $\beta_{n,n'}^k$, units of commodity k flow at node n'.

Three different varieties of the problem are of interest: 1) the feasibility problem, 2) the maximum concurrent problem, and 3) the maximum weighted flow problem. Denote $x_{u,n'}^k$, the amount of commodity k flow to be processed at node n∈N' that will generate output to downstream node n'∈O'(n). A feasible solution has to satisfy the following conditions:

$$x_{n,n'}^k \geq 0, \forall k; n, n' \in N' \quad (1)$$

$$\sum_k \sum_{n' \in O'(n)} x_{n,n'}^k r_{n,n'}^k \leq R_n, \forall\ n \in N' \quad (2)$$

and for all k and n∈N', $$\sum_{n' \in O'(n)} x_{n,n'}^k - \sum_{n'' \in I'(n)} x_{n'',n}^k \beta_{n'',n}^k = \begin{cases} f^k, & \text{if } n = s^k \\ -g^k f^k, & \text{if } n = t^k \\ 0, & \text{otherwise} \end{cases} \quad (3)$$

Conditions (1) and (2) ensure respectively the non-negativity requirement on the assignment and the resource constraint on each node. Condition (3) represents the flow balance requirements such that incoming flows arrive at the same rate as outgoing flows being consumed at each node for each commodity. Note that such balance holds only on the nodes, not when the flow is shipped across edges.

The three different varieties of the problem can be then formulated as the following linear programs respectively:

1. The feasibility problem for demand $d^k$, k=1 . . . , K
   [PF] $f^k = d^k$, ∀k; subject to (1)-(3).
   That is, a feasible solution will successfully consume $d^k$ units of commodity k flow per unit time at source k for commodity k, k=1, . . . , K.

2. The maximum concurrent flow problem is:
   [PC] max δ subject to $f^k = \delta d^k$, ∀k and (1)-(3).
   where $d^k$ are given. That is, the problem will find the maximum fraction δ so that the network is feasible with input rates $\delta d^k$ for commodity k, k=1, . . . , K.

3. The maximum weighted flow problem (given the maximum input rate at source k is $\lambda^k$, k=1, . . . , K) is:

$$[PM] \max \sum_{k=1}^{k} w^k g^k f^k$$

subject to $f^k \leq \lambda^k$, ∀k; and (1)-(3).
That is, the problem is to maximize the total weighted sum of return of all outputs for all commodities.

Problem 1 is useful in finding solutions for a targeted throughput. Problem 2 makes sense when the demand proportions for multiple applications are fixed (e.g. in a mature market) and the system gives a fair effort for all applications. Problem 3 is favored for a service provider, which maximize the total benefit by efficiently allocating its resources among the multiple services.

These linear programs represent centralized solutions. The linear problems can serve to provide the theoretical optimum so that the quality of the distributed solutions can be determined. In the following, distributed solutions for the three problems are provided.

Figure 5:
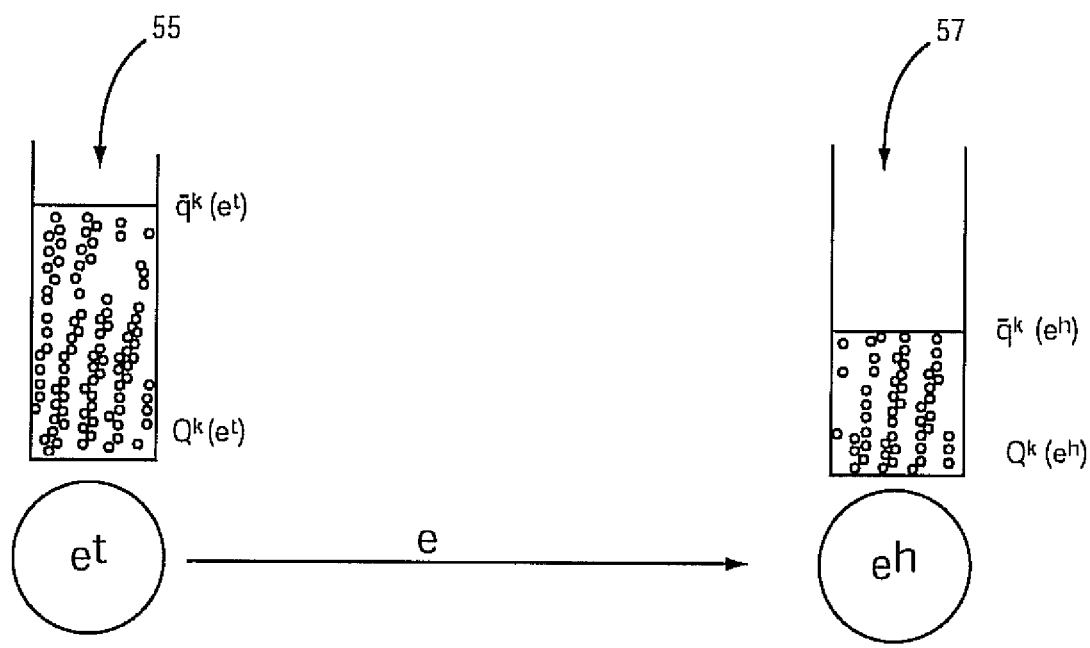
FIG. 5 is a diagram showing queue heights for input and outputs at edges in a network in accordance with present principles.

Feasibility Problem: The feasibility problem [PF] consumes $d^k$ units of commodities k (per unit of time) at source k, k=1, . . . , K. Consider the time evolution of the network as proceeding in a sequence of synchronous rounds, each lasting for unit time. The continuous feasible flow problem will be solved by interpreting it as a flow problem in which source $s^k$ pumps $d^k$ units of commodity k flow into the system in each round. A method for the continuous flow problem will be considered to be stable if the total amount of flow residing in the system at any time remains bounded. Clearly, such an algorithm or method is able to deliver the injected flow in the long run. Construct a feasible flow for problem [PF] using the average of the continuous solution. The notation used includes reference to edges, means directed edges. An input and an output queue are maintained for each commodity at the tail and the head of each edge e∈ϵ, denoted as buffer $Q^k(e^h)$ and $Q^k(e^t)$ respectively for commodity k. Denote $q^k(e^h)$ and $Q^k(e^t)$ as the amount of flow (or height) respectively in buffer $Q^t(e^h)$ and $Q^k(e^t)$. Let $\bar{q}^k(e^h)=q^k(e^h)/d^k$ and $\bar{q}^k(e^t)=q^k(e^t)/d^k$ be the relative heights (normalized by the demand). FIG. 5 illustratively depicts input and output buffers/queues 55 and 57, respectively, associated with each edge e (or link in a network).

Distributed Solution: A potential function $\Phi(\bar{q})$ associated with every queue is defined, where $\bar{q}$ is the (relative) height. In general, the potential function needs to be twice-differentiable and convex. With these properties, the total potential function of n queues of heights $q_1, \ldots, q_n$, defined as $$\Phi(q_1, \ldots, q_n) = \sum_{i=1}^{n} \Phi(q_i),$$

is Schur Convex, as is known in the art. Thus, the more balanced the queues are, the lower the total potential. For example, for $$\Phi(y) = \frac{y^2}{2},$$

it is easily checked that $$y_1^2 + \ldots + y_n^2 \geq n\left(\frac{y_1 + \ldots + y_n}{n}\right)^2.$$

In this disclosure, consider the illustrative potential function $$\Phi(y) = \frac{y^2}{2}.$$

Other efficient methods may include other potential functions such as, e.g., the exponential function.

Specifically, for any edge e and commodity k, define $\Phi^k(e)=\Phi(\bar{q}^k(e^t))+\Phi(\bar{q}^k(e^h))$.

Define the potential of a given node $n \in N'$ as $$\Phi(n) = \sum_{k=1}^{K} \sum_{n' \in O'(n)} \Phi^k(e_{n,n'}),$$

where $e_{n,n'}$ denotes edge (n,n'). The potential of the entire system, $\Phi$, is simply $\Phi = \Sigma_{n \in N'} \Phi(n)$.

Figure 6:
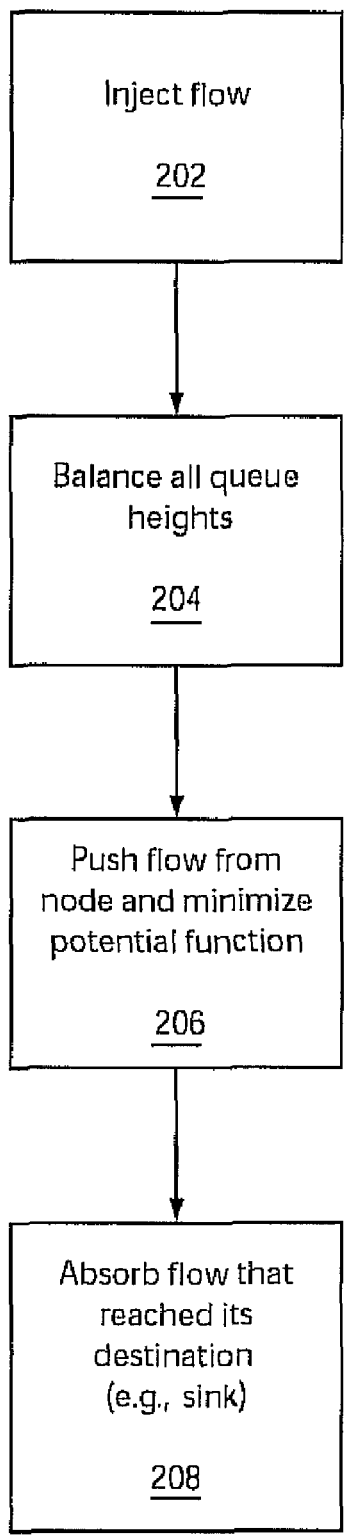
FIG. 6 is a block/flow diagram showing method 1 for solving a feasibility problem for resource allocation in accordance with present principles.

Referring to FIG. 6, the following (distributed) method is provided to find the feasible solution, inspired by the well-known Awerbuch-Leighton Algorithm. In each round of the method, the following four phases are performed.

Method 1 (for the Feasibility Problem): In block 202 (phase 1), for each commodity k, inject $d^k$ units of flow at its corresponding source $s_k$. In block 204 (phase 2), balance all queues for commodity k at node n to equal heights. In block 206, (phase 3), for every node $n \in N'$, push $x_{n,n'}^k \geq 0$ amount of commodity k flow across edge (n,n') for all $n' \in O'(n)$, (let $e_{n,n'}$ denote the edge (n,n')), so that $$\sum_{k} \sum_{n' \in O'(n)} \lfloor \Phi(\bar{q}^k(e_{n,n'}^t) - \bar{x}_{n,n'}^k) + \Phi(\bar{q}^k(e_{n,n'}^h) + \beta_{n,n'}^k \bar{x}_{n,n'}^k) \rfloor \quad (4)$$

is minimized under the constraint that $$\sum_{k} \sum_{n' \in O'(n)} d^k \cdot \bar{x}_{n,n'}^k \cdot r_{n,n'}^k \leq R_n. \quad (5)$$

where $\bar{x}_{n,n'}^k = x_{n,n'}^k/d^k$. If $n'=t_k$, we set the second term in (4) to be zero as the potential at sink node $t_k$ is always zero.

In other words, node n's resource allocation decision is based on the goal to reduce, as much as possible, the total potential for all queues over all outgoing edges associated with node n. Once the optimal $\bar{x}_{n,n'}^k$'s are derived, node n then sends a flow of $d^k \cdot \bar{x}_{n,n'}^k$ across edge (n,n') from $Q^k(e_{n,n'}^t)$ to $Q^k(e_{n,n'}^h)$. Notice that the resulting (normalized) queue height at $Q^k(e_{n,n'}^h)$ will be $\bar{q}^k(e_{n,n'}^h) + \beta_{n,n'}^k \bar{x}_{n,n'}^k$ due to the expansion factor $\beta_{n,n'}^k$; the (normalized) queue height at $Q^k(e_{n,n'}^t)$ will be $\bar{q}^k(e_{n,n'}^h) - \bar{x}_{n,n'}^k$.

In block 208 (phase 4), absorb flow that reached its destination by draining all queues for commodity k at sink k.

Optimal resource allocation at each node: In phase 3 (block 206), for every node $n \in N'$, method 1 selects to process flows (among all commodities and all the outgoing edges at node n) so as to minimize the resulting potential function $\Phi(n)$ (or equivalently, maximize the potential drop at node n) subject to the resource constraint $R_n$. Using Lagrangian multipliers, the optimal solution for the optimization problem may be defined such that (4) and (5)

$$\text{satisfy: } \frac{\partial L}{\partial \bar{x}_{n,n'}^k} = 0$$

for all k, n, n', where $$L = \sum_{k} \sum_{n' \in O'(n)} \lfloor \Phi(\bar{q}^k(e_{n,n'}^t) - \bar{x}_{n,n'}^k) + \Phi(\bar{q}^k(e_{n,n'}^h) + \beta_{n,n'}^k \bar{x}_{n,n'}^k) \rfloor +$$

$$s \sum_{k} \sum_{n' \in O'(n)} d^k \cdot \bar{x}_{n,n'}^k \cdot r_{n,n'}^k$$

with $s \geq 0$.

$$\text{Solve } \frac{\partial L}{\partial \bar{x}_{n,n'}^k} = 0, \text{ then:} \quad (6)$$

$$\bar{x}_{n,n'}^k = \max\left\{\frac{\Delta^k(e_{n,n'}) - s d^k \cdot r_{n,n'}^k}{1 + (\beta_{n,n'}^k)^2}, 0\right\},$$

with $\Delta^k(e_{n,n'}) = \bar{q}^k(e_{n,n'}^t) - \beta_{n,n'}^k \bar{q}^k(e_{n,n'}^h)$ The optimal value of s is the minimum $s \geq 0$ such that (5) is satisfied. That is, $$\sum_k \sum_{n' \in O'(n)} d^k r_{n,n'}^k \max\left\{\frac{\Delta^k(e_{n,n'}) - sd^k \cdot r_{n,n'}^k}{1 + (\beta_{n,n'}^k)^2}, 0\right\} \leq R_n. \quad (7)$$

This value can be found as follows. Denote $$h_{n,n'}^k = \frac{\Delta^k(e_{n,n'})}{d^k r_{n,n'}^k},$$

and $$a_{n,n'}^k = \frac{(d^k r_{n,n'}^k)^2}{1 + (\beta_{n,n'}^k)^2}.$$

First, sort the values of $h_{n,n'}^k$ in decreasing order for all $n' \in O'(n)$ and all k. Then, using the binary search to find the maximal set $S^+$ of pairs (k,n') such that:

i) if $(k_1,n_1') \in S^+$ and $(k_2,n_2') \notin S^+$, then $h_{n,n_1'}^{k_1} > h_{n,n_2'}^{k_2}$ and
ii) $\Sigma_{(k,n') \in S^+}(h_{n,n'}^k - s) \cdot a_{n,n'}^k \leq R_n$, for $s = \min_{(k,n') \in S^+} h_{n,n'}^k$.
Once $S^+$ is determined, we can then compute s by setting $$s = \max\left\{0, \frac{\left\lfloor \sum_{(k,n') \in S^+} a_{n,n'}^k h_{n,n'}^k \right\rfloor - R_n}{\sum_{(k,n') \in S^+} a_{n,n'}^k}\right\}.$$

Figure 7:
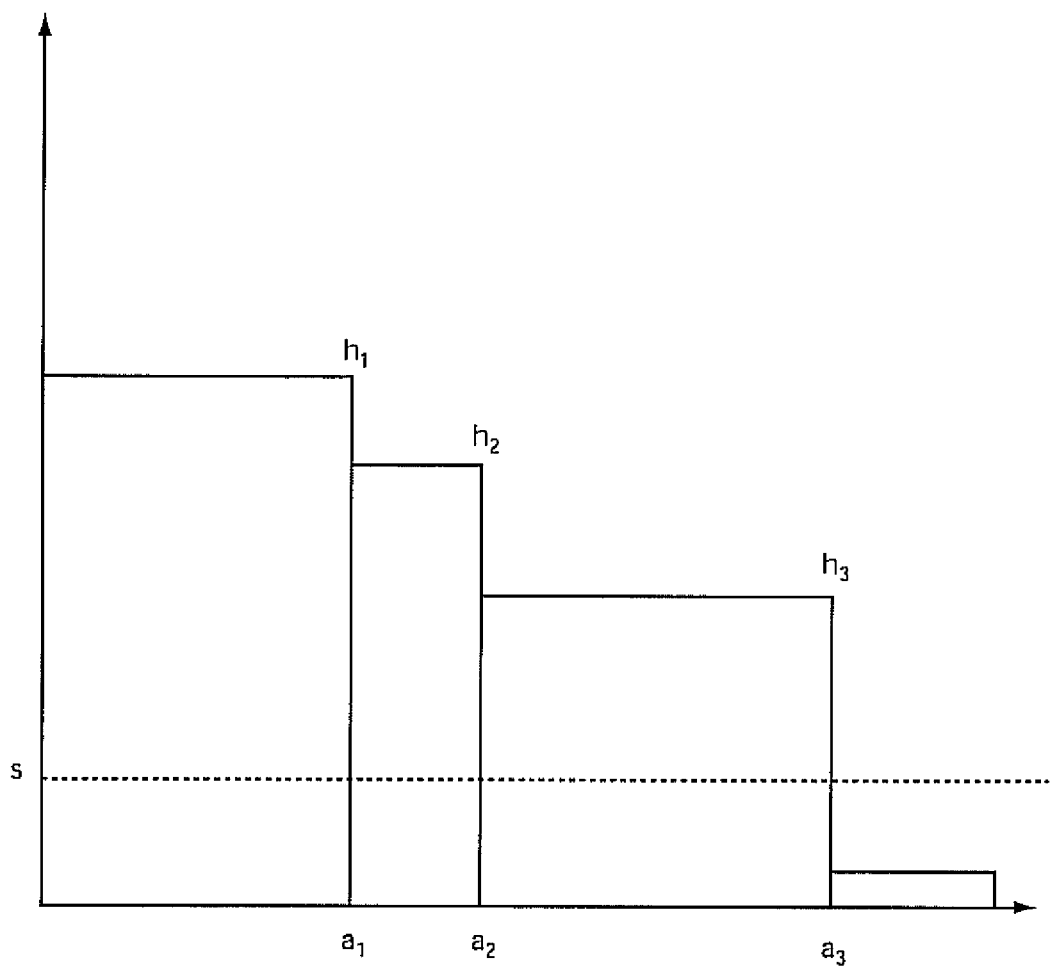
FIG. 7 is a diagram schematically showing a reverse water filling method for solving problems in accordance with present principles.

The solution can be obtained using a reverse 'water-filling' method as shown in FIG. 7. The optimal s (dashed line in FIG. 7) is the line above which the total area is equal to available capacity $R_n$, which can be obtained by water filling into the bucket made by turning FIG. 7 upside down.

Properties of Method 1: The following theorem shows that Method 1 is stable and all queues in the system will stay bounded as desired.

Theorem 1: Consider multicommodity feasibility problem [PF]. If for demands $(1+\in)d^k$, $k=1, \ldots K$, there is a feasible solution that uses paths of length at most L, then for continuous flow the problem with demands $d^k$, method 1 is stable and all queues will be bounded by $$\bar{q}\max := 2\sqrt{M}(\bar{\beta}^L \vee 1) \cdot C(\bar{\beta},L)K(1+\in)^2/\in \quad (8)$$

where $$C(\bar{\beta}, L) = \frac{1 + \bar{\beta}^2}{2} \cdot \frac{1 - \bar{\beta}^{2L}}{1 - \bar{\beta}^2}, \text{ and } \bar{\beta} = \max_{k,n,n'} \beta_{n,n'}^k. \quad (9)$$

Notice that when all $\beta_{n,n'}^k$'s are 1's (i.e. flow conservation holds and there are no expansion effects), the above hound reduces to be the same as that in the original AL-algorithm.

Stop Criterion: Based on Theorem 1, since all queues are bounded, after running Method 1 continuously for T rounds, when T is large enough, the flow remaining in the system will satisfy:

$$\sum_n \sum_{n' \in O'(n)} \frac{\lfloor \bar{q}^k(e_{n,n'}^t) + \bar{q}^k(e_{n,n'}^h) \rfloor d^k}{g_n^k} \leq \in d^k T \quad (10)$$

Note that from source node $s_k$'s point of view, a unit of commodity k flow at node n corresponds to $1/g_n^k$ units of flow from source $s_k$ being successfully shipped to node n due to the expansion factor $g_n^k$.

After T rounds, we will have input $d^k T$ units of commodity k into the source node $s_k$. From (10), at most $\in d^k T$ units of commodity k (in the view of the source node $s_k$) remain in the system, thus $(1-\in)d^k T$ units of commodity k should have successfully reached sink $t_k$. Hence, the long run consumption rate is at least $(1-\in)d^k$ for commodity k. (10) can be used as the stop criterion for Method 1, and the average (i.e. dividing by T) of the continuous solution gives a feasible solution to the static flow problem with demand $(1-\in)d^k$. The following corollary is immediate.

Corollary 2: If the multicommodity problem [PF] is feasible for demands $(1+\in)d^k$, $k=1, \ldots K$, then there is also feasible solution (for the static problem) satisfying demands $(1-\in)d^k$, obtained by averaging the continuous solution from Method 1.

The following two propositions give the complexity of Method 1.

Theorem 3: Each round of Method 1 takes at most O(NKM (log K+log M)) steps. Proof: Phases 1 and 2 (block 202 and 204) take $KD_{max}$ steps where $D_{max}$ is the maximum node degree. Phase 4 (block 208) takes at most 2MK steps. In Phase 3 (block 206), the assignment at each node can be implemented in $O(KD_{max} \log(KD_{max}))$ steps due to the sorting operation and the binary search process used to find $S^+$. Since $D_{max} \leq 2M$, Phase 3 needs at most O(NKM(log K+log M) steps. Therefore, each round of Method 1 takes at most O(NKM(log K+log M) steps.

Theorem 4: Method 1 terminates in at most T rounds, where T is bounded by $T_{max} = 8M^{3/2}(\bar{\beta}^L \vee 1) \cdot C(\bar{\beta},L)K(1+\in)^2/\in^2$. Proof: Note that the left hand side of (10) is bounded by $2M\bar{q}_k d^k$, by setting (10) to equality, we can then obtain an upper bound for the stopping time T which gives $T_{max} = 2M\bar{q}_{max}/\in$. The result then follows immediately based on (8).

The maximum concurrent flow problem: Use Method 1 presented above to solve the maximum concurrent multicommodity flow problem. Note that for the concurrent problem, the proportion of injected flow among multiple commodities $d^1:d^2: \ldots :d^k$ is fixed, the problem is to find the maximum concurrent flow value $\delta$ such that input at rate $\vec{d}(\delta):=(\delta d^1, \delta d^2, \ldots, \delta d^K)$ is feasible.

Set the input rate to be $\bar{d}(\delta)$, and vary $\delta$ until it converges to optimal $\delta^*$. The key observation is that if $\delta$ is too large, then input rate $\bar{d}(\delta)$ is too much for the network and the source queues will grow without bound; on the other hand, if $\delta$ is smaller than $\delta^*$, then $\bar{d}(\delta)$ should also be feasible and all queues will stay bounded based on Theorem 1. Hence, start out $\delta$ at some value that is smaller than the true maximum concurrent flow value and increase (e.g., double) it until finding that some queue exceeds the bound defined in Theorem 1. At which point ensure that the optimal $\delta^*$ is within a factor of two. Then perform a bisection search to determine $\delta^*$ exactly. The above procedure can be summarized as follows with reference to FIG. 8.

Figure 8:
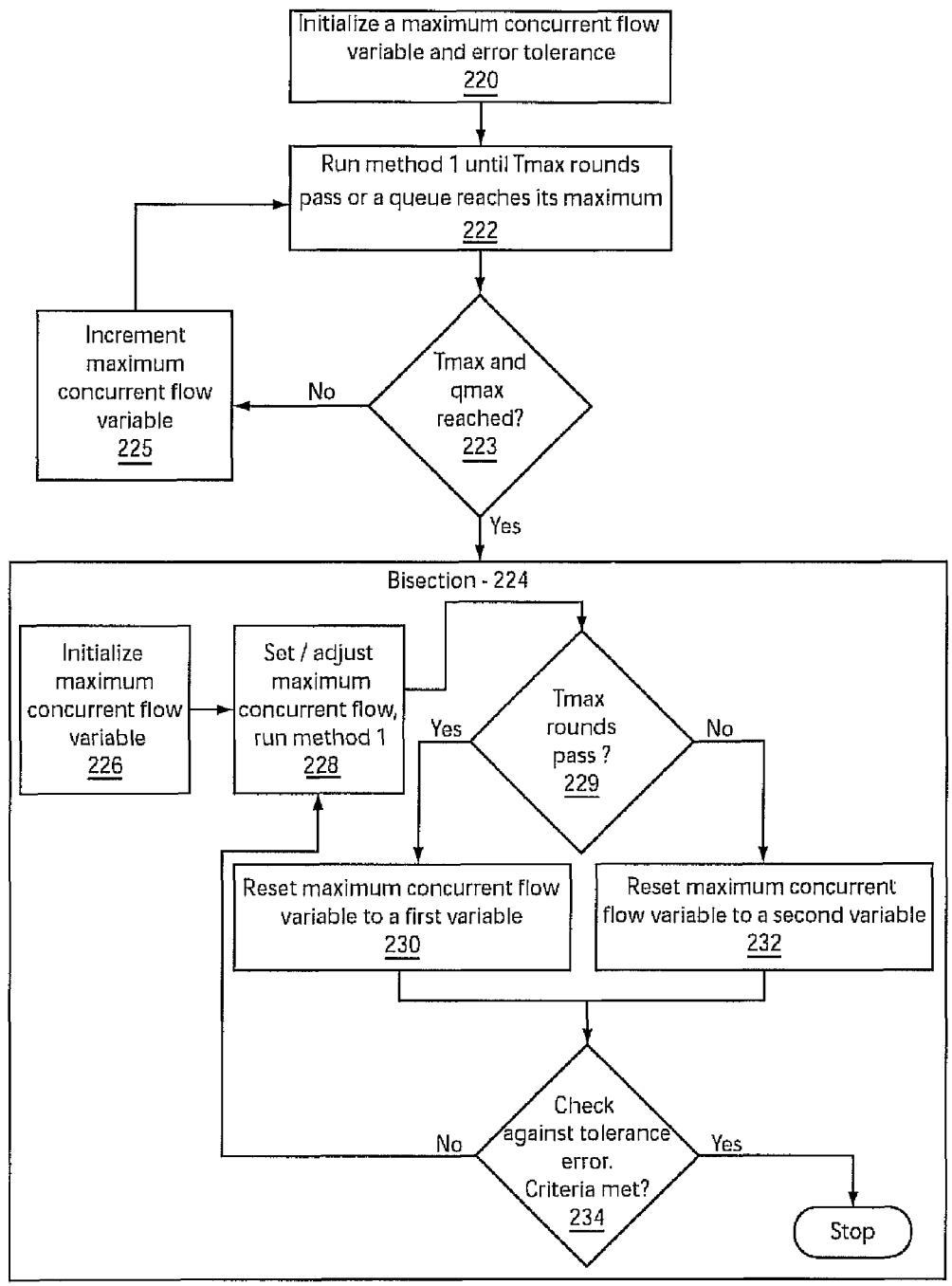
FIG. 8 is a block/flow diagram showing method 2 for solving a maximum concurrent flow problem for resource allocation in accordance with present principles.

Method 2: (Search Algorithm for the Max Concurrent Problem): Referring to FIG. 8, in block 220, initialize $\delta = \delta_o$, and $\eta > 0$ to be the relative error tolerance level. In block 222, run method 1 until $T_{max}$ rounds pass, or one of (normalized) queues exceeds $\bar{q}_{max}$. In block 223, if $T_{max}$ rounds pass and no queue has exceeded $\bar{q}_{max}$, increment (e.g., double) δ in block 225 and repeat block 222. Otherwise, go to block 224. In block 224, bisection is performed.

For the bisection step (224), in block 226, initialize $\delta^h=\delta$, and $\delta_1=0$. If $\delta>\delta_0$, set $\delta_1=\delta/2$. In block 228, set $\delta=(\delta^h+\delta_1)/2$, and run Method 1 until $T_{max}$ rounds pass, or one of the (normalized) queues exceeds $\bar{q}_{max}$. In block 229, if $T_{max}$ rounds have passed, then set $\delta_1=\delta$ in block 230 and go to block 234. Otherwise, set $\delta^h=\delta$ in block 232 and go to block 234. In block 234, if $(\delta^h-\delta_1)/\delta_1 < \eta$, then stop. Otherwise, go back and repeat block 228.

Maximum weighted flow problem: Consider the maximum weighted multicommodity flow problem. Assume all commodities have a maximum available input rate λ. One goal is to find the best injection rate $d^k$ for commodity k, k=1, ..., K, such that $d^k \leq \lambda$ and $\Sigma_k w^k g^k d^k$ is maximized, where $g^k$ denotes the final expansion effect for commodity k, i.e. if a unit of flow from source $s^k$ is successfully delivered, we have $g^k$ units of output at sink $t^k$.

A distributed algorithm based on Method 1 will be presented to solve the problem. Since the optimal injection rate is not known, set $d^k=\lambda$ for every commodity k. Every source node $s^k$ of commodity k injects λ units of flow for commodity k into the system at each round, which is an upper bound on what the system can deliver. Clearly, if the system can handle the upper bound injection rate λ, the problem is solved. The excessive flow is controlled by queue spilling. That is, each queue sets a limit on the maximum allowed height H (to be specified later in more detail). Any flow exceeding this limit is simply deleted. The optimal weighted throughput may be achieved through deletion. Using this strategy, method 3 is presented below.

Figure 9:
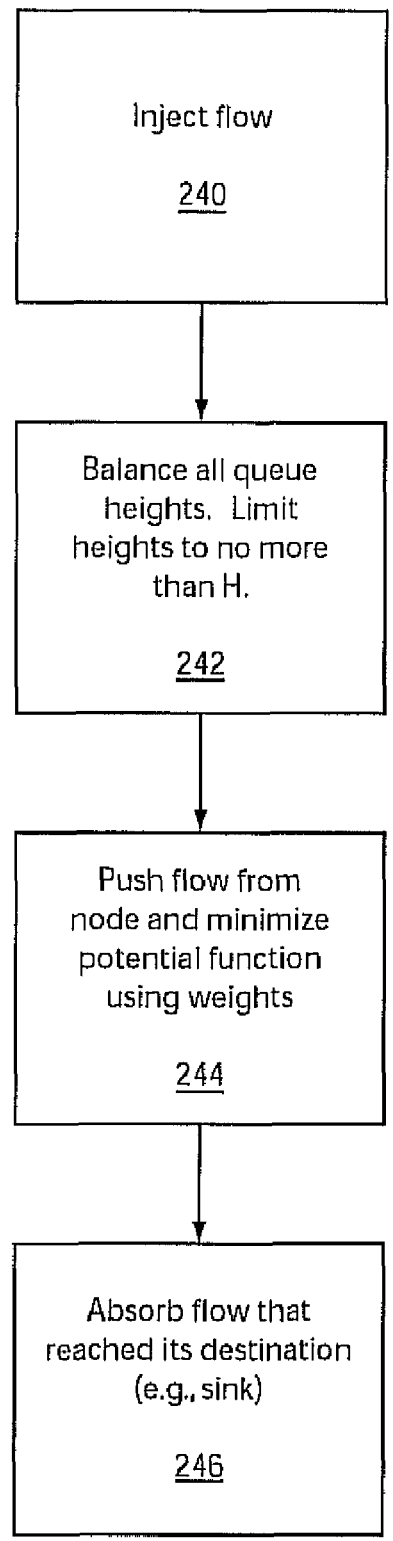
FIG. 9 is a block/flow diagram showing method 3 for solving a maximum weighted flow problem for resource allocation in accordance with present principles.

Method 3 (for the Maximum Weighted Flow Problem): Referring to FIG. 9, in block 240 (phase 1), for each commodity k, inject $d^k$ units of flow at its corresponding source $s^k$. In block 242 (phase 2), balance all queues for commodity k at node n to equal heights. Delete any excess flow so that every queue has height no more than H. In block 244 (phase 3), for every processing node $n \in N'$, find flows $x_{n,n'}^k$, for all, so that $$\sum_k w^k \sum_{n' \in O'(n)} [\Phi(\bar{q}_n^k - \bar{x}_{n,n'}^k) + \Phi(\bar{q}_{n'}^k + \beta_{n,n'}^k \bar{x}_{n,n'}^k)]$$

is minimized under the constraint that $\Sigma_k \Sigma_{n \in O'(u)} d^k \cdot \bar{x}_{n,n'}^k \cdot r_{n,n'}^k \leq R_n$, where $\bar{x}_{n,n'}^k = x_{n,n'}^k/d^k$.

For each commodity k, send a flow of $d^k \cdot \bar{x}_{n,n'}^k$ from $Q^k(n, n')$ to $Q^k(n',n)$. Note that the resulting queue height at $Q^k(e_{n,n'}^h)$ will be $\bar{q}^k(e_{n,n'}^h) - \bar{x}_{n,n'}^k$, the queue height at $Q^k(e_{n,n'}^h)$ will be $\bar{q}^k(e_{n,n'}^h) + \beta_{n,n'}^k \bar{x}_{n,n'}^k$.

In block 246 (phase 4), absorb flow that reached its destination by draining all queues for commodity k at sink k. Note that the flow weights $w^k$ are used in block 244 (phase 3) to account for the weighing factors in the objective function. The following theorem proves the convergence property and the solution quality of method 3.

Theorem 5: For any maximum weighted multicommodity flow problem with K commodities, the bounded Awerbuch-Leighton (AL) algorithm, with queues that can accommodate a flow of up to $$\bar{q}^k(e) = B \cdot \frac{2L}{\varepsilon},$$

where B is the maximum queue length derived in the previous section, and L is the longest path length in an optimal solution, delivers a solution with total return that is at most a(1+ε)-factor away from the total return of an optimal solution.

Note that Method 3 depends on the buffer size H, which controls the maximum allowed queue length in the system. Choosing the right parameter H is thus important to the performance. If H is set too low, then the algorithm may delete too much flow, and then converge to a sub-optimal solution. If H is set too high, then the method can take an unacceptably long time to converge. A buffer size of $2LB_{OPT}^*/\varepsilon$ where $B_{OPT}^*$ is the maximum queue size ever reached by the optimal solution, but clearly $B_{OPT}^*$ is not known unless one knows the optimal solution. In our experiments, we have found that setting the buffer size H=2 L max $g^k/\varepsilon$ works well.

Implementation and Numerical Results: In dynamic large scale environments, the centralized solutions are difficult to realize as the solutions may not be able to keep up with the changing environment. Furthermore, the centralized solutions may change by large amounts over a short time frame, which could lead to unstable system behavior. The methods presented herein have the advantages that they do not require global information, and can easily adapt to dynamic changes. The input and output queues, or the buffers in the presented solutions make it easy to implement in real systems. The methods could directly correspond to communication buffers at the servers.

For each iteration, a server only needs to know the buffer levels at its neighboring nodes to determine the appropriate amount of processing and transmission. As shown earlier, such a local control mechanism will lead to global optimal solutions. Dynamic changes of the system characteristics such as changes to flow expansion factors or server capacities will lead to changes to the parameters in the problem formulation. Each server can keep a running estimate of these parameters. As the changes occur, each server naturally adjusts its decisions locally. Numerical results presented below demonstrate that these procedures continue to provide high quality solutions.

Experimental results to compare the performance of the distributed algorithms with the corresponding static linear programming (LP) solutions are presented. The network topology was generated randomly. Probability-based Erdos-Renyi random graphs and random graphs generated by uniformly generating points in a unit square were explored. For Erdos-Renyi random graphs, the probability of connecting two points is set to be p≈log N/N, which ensures the connectivity of the graph for large N. Once the graph is generated, the parameters on demands d, resources R, expansion factors β, weights w and unit flow resource requirements r are then generated from independent uniform random samples. The potential function was taken to be the square of the queue heights.

Graphs of different sizes randomly generated by varying the number of commodities K, the number of nodes N and the number of edges M. The distributed algorithms were applied and the corresponding goodput (i.e. the amount of flow readied its corresponding sink successfully) was collected for each commodity and the total run time. The corresponding LP solution for the static problem was obtained using an LP solver.

Figure 10:
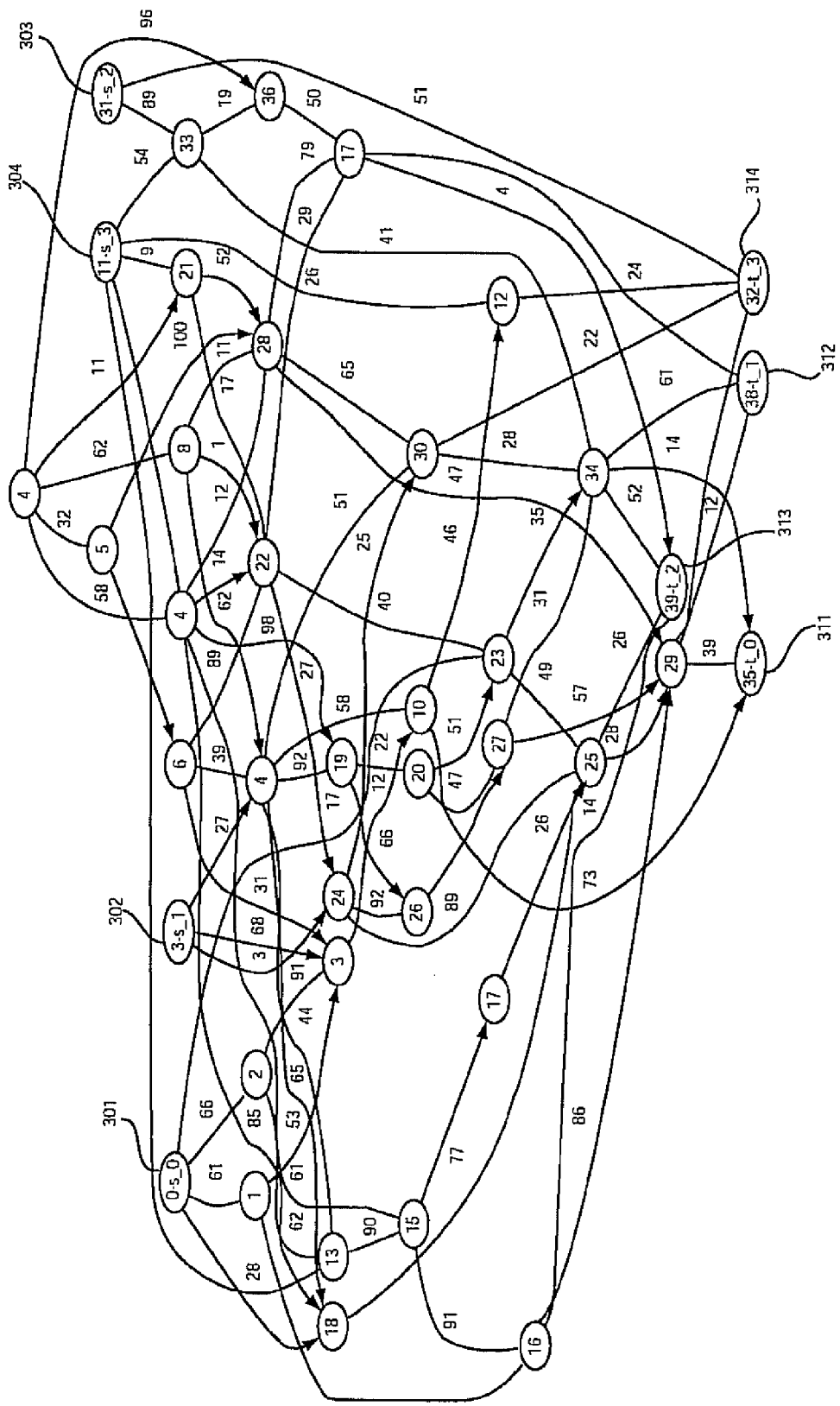
FIG. 10 is a diagram showing a randomly generated network for testing in accordance with present principles.

Referring to FIG. 10, as an example of a random graph (generated by the second method, i.e., random graphs generated by uniformly generating points in a unit square) with 40 nodes (ovals), 4 source and sink pairs (e.g., 301 and 311, 302 and 312, 303 and 313, and 304 and 314) corresponding to a commodity problem. We will deal with 3 commodities. First, the feasibility problem associated with this graph was considered, where the desired goodput for the 3 commodities are respectively set at: $d^0g^0=15.5$, $d^1g^1=4.5$ and $d^2g^2=11.1$. The results are illustratively shown in FIG. 11.

Figure 11A:
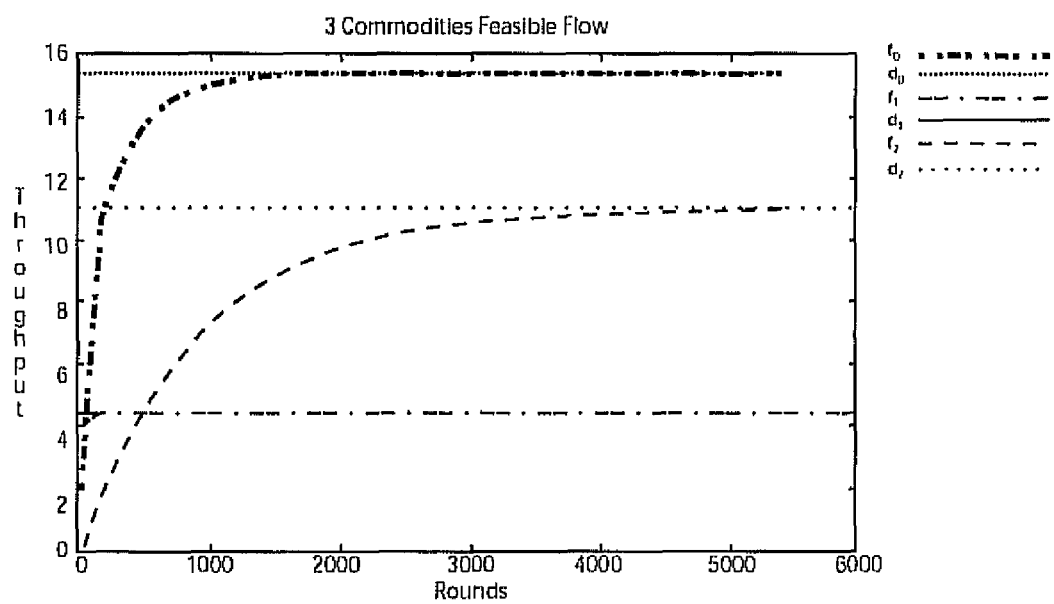
FIG. 11A is a diagram showing convergence to a desirable flow using the feasibility approach in accordance with present principles.
Figure 11B:
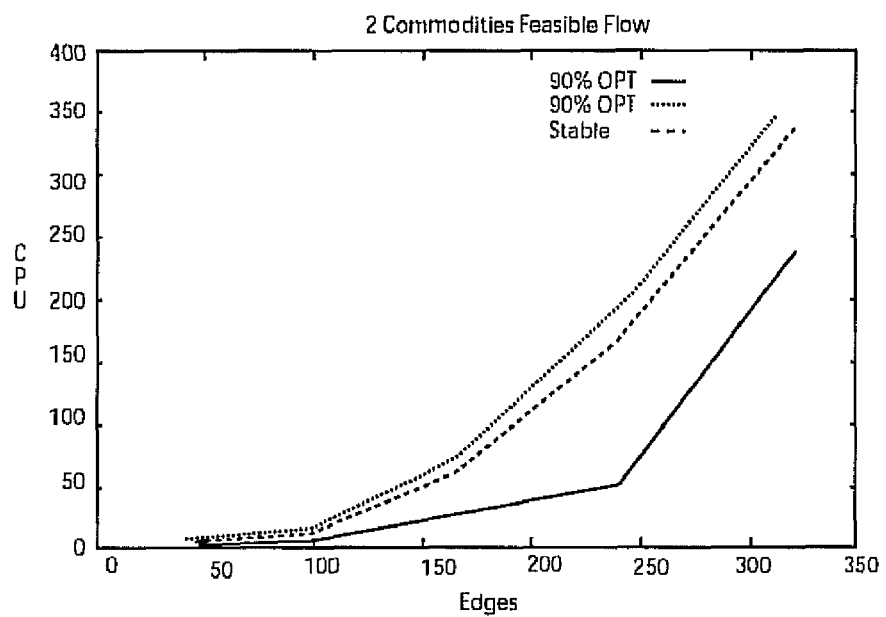
FIG. 11B is a diagram showing computational time for reaching convergence in FIG. 11A in accordance with present principles.

Referring to FIGS. 11A and 11B, feasible flow problem results are shown for the random network depicted in FIG. 9. E.g., the network includes 3 commodities and 40 nodes. FIG. 11A shows total flow reaching a sink. FIG. 11B shows CPU usage as a function of network size.

FIG. 11A shows the performance of Method 1 of the feasibility problem, where the throughput achieved each round for each commodity is plotted as a function of the number of rounds. Observe that the goodput improves monotonically until it reaches the desired level, which shows that the distributed algorithm continuously improves its allocation thus pushing more and more flow in the right direction. The distributed algorithm was able to converge to the desired goodput. The convergence was very quick for commodity 0 and commodity 1, and a bit slower for commodity 2. Although it took about 6000 rounds for commodity 2 to converge to its desired throughput, in computation (CPU) time, it was less than a second, which is quite impressive.

FIG. 11B shows the CPU time it took on average for Method 1 to converge for networks for varying sizes. The three curves show respectively the CPU time it takes to reach 90% optimal, 99% optimal, and completely stable. It can be seen that at least half of the run time is cut if a 90%-optimal solution is acceptable. Observe that the larger the network, the longer it takes to converge. The curve grows super-linearly in the total number of edges of the network, which is consistent with the complexity results derived earlier that $T_{max} \sim M^{3/2}$. In fact, since our analytical bound on the complexity is based on worst case analysis, we find that in most of our experiments, the convergence time of the distributed algorithms is typically many orders of magnitude faster than the analytically bound. In addition, the maximum queue size in the system is also many orders of magnitude lower than the analytical bound given by EQ. (8), which indicates that the distributed method in accordance with present principles should work well in practice as the assumption on large buffer capacity is not really necessary.

The maximum concurrent flow problem is solved by using the bisection search algorithm and running Method 1 multiple times. The numerical results are the same as the results for the feasibility problem.

Figure 12:
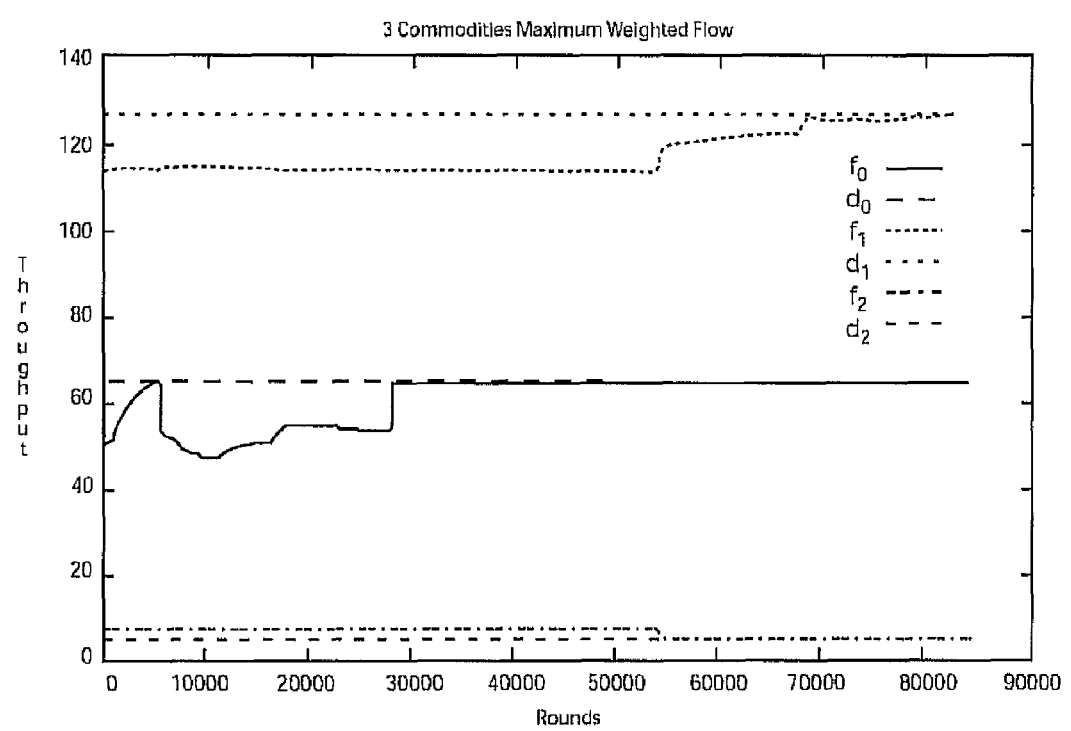
FIG. 12 is a diagram showing convergence to a desirable flow using the maximum weighted flow approach in accordance with present principles.

Referring to FIG. 12, the performance of method 3 is compared with the optimal solution obtained by the static LP for the maximum weighted multicommodity flow problem and is illustratively shown. The buffer size limits are set to, e.g., $H=2L \max g^k/\epsilon$. In a majority of cases, convergence time decreased significantly as compared with other naive value choices for H. FIG. 12 illustrates such an example for a 3-commodity 100-node maximum weighted flow problem. Observe that the goodput of all three commodities eventually converges to the optimal level.

The problem of how to distribute the processing of a variety of data streams over the multiple cooperative servers in a communication network has been addressed. The network is resource constrained in both computing resources at each server and in bandwidth capacity over the various communication links. A graph representation of the problem has been presented. It has been shown how to map the original problem into an equivalent multicommodity flow problem. Three different variants of objectives were considered and developed distributed methods for each case. Via both theoretical analysis and numerical experiments, these distributed methods are able to achieve an optimal solution.

Having described preferred embodiments for systems and methods for distributed resource allocation in stream processing systems (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for resource allocation, comprising:
in a network having nodes and links, injecting components of flow for at least one commodity at a source corresponding to the at least one commodity;
at each node, balancing queue heights, associated with the at least one commodity, for queues associated with each of one or more outgoing paths associated with that node;
pushing an amount of commodity flow across a link toward a sink, including handling expansion and contraction of a quantity of the components of flow at the node, where the amount of commodity flow is constrained by a capacity constraint; and
absorbing flow that reached the sink by draining the queues.

2. The method as recited in claim 1, wherein balancing includes providing a potential function to determine adjustments to the queue heights for reducing a total potential for all queues.

3. The method as recited in claim 2, further comprising minimizing the potential function by adjusting unit-s components of flow for all queues.

4. The method as recited in claim 1, wherein balancing includes using a reverse water filling method to identify a threshold for balancing the queue heights in accordance with the capacity constraint for the node.

5. The method as recited in claim 1, further comprising determining a maximum concurrent flow rate for a plurality of commodities, by initializing a maximum concurrent flow rate variable and an error tolerance value; performing the steps as recited in claim 1 until a number of iterations exceeds T or a queue threshold is exceeded due to the maximum concurrent flow rate variable; if T iterations have been exceeded without exceeding a queue threshold, increasing the maximum concurrent flow rate variable; and bisecting the maximum concurrent flow rate variable until a criterion is met to maximize concurrent flow rate.

6. The method as recited in claim 5, wherein bisecting includes: P1 adjusting the maximum concurrent flow rate variable and repeating the step of performing.

7. The method as recited in claim 6, wherein bisecting includes:
comparing a function of the maximum concurrent flow rate variable to the error tolerance value to determine when the maximum concurrent flow rate has been determined.

8. The method as recited in claim 1, wherein balancing queue heights includes balancing all queue heights for the at least one commodity to equal heights;

and deleting any excess flow so that every queue in the node has a height of no more than a buffer size (H).

9. The method as recited in claim 1, wherein balancing all queue heights includes providing weighting factors for commodities to adjust flow to maintain the queue heights.

10. A computer program product for resource allocation comprising a non-transitory computer useable storage medium including a computer readable program, wherein the computer readable program when executed on a computer causes the computer to perform the steps of in a network having nodes and links, injecting components of flow for at least one commodity at a source corresponding to the at least one commodity;

at each node, balancing queue heights, associated-with the at least one commodity, for queues associated with each of one or more outgoing paths associated with that node;

pushing an amount of commodity flow across a link toward a sink, including handling expansion and contraction of a quantity of the components of flow at the node, where the amount of commodity flow is constrained by a capacity constraint; and absorbing flow that reached the sink by draining the queues.

11. The non-transitory computer program product as recited in claim 10, further comprising:

determining a maximum concurrent flow rate for a plurality of commodities, by:

initializing a maximum concurrent flow rate variable and an error tolerance value;

performing the steps as recited in claim 11 until a number of iterations exceeds T or a queue threshold is exceeded due to the maximum concurrent flow rate variable;

if T iterations have been exceeded without exceeding a queue threshold, increasing the maximum concurrent flow rate variable; and bisecting the maximum concurrent flow rate variable until a criterion is met to maximize concurrent flow rate.

12. The non-transitory computer program product as recited in claim 10, wherein balancing queue heights includes:

balancing all queue heights for the at least one commodity to equal heights; and deleting any excess flow so that every queue in the node has a height of no more than a buffer size (H).

13. A resource allocation system, comprising:

at least one queue corresponding to one or more outgoing paths;

an input path configured to receive one or more commodities in a distributed network;

a resource allocation program configured to balance queue heights for flow unit-s components injected in the queues associated with the at least one commodity, the resource allocation program further configured to push an amount of commodity flow across a link toward at least one sink, where the amount of commodity flow is constrained by a capacity constraint, wherein the queues permit expansion and contraction of a quantity of components of flow from the node.

14. The system as recited in claim 13, wherein the resource allocation program includes a potential function which determines adjustments to the queue heights for reducing a total potential for all queues.

15. The system as recited in claim 13, wherein the resource allocation program includes a reverse water filling method to identify a threshold for balancing the queue heights in accordance with the capacity constraint for the node.

16. The system as recited in claim 13, wherein the resource allocation program allocates resources based on one of feasibility, maximum concurrent flow and maximum weighted flow.

17. The system as recited in claim 13, wherein the system is included on a node and the node allocates resources through the node without awareness of resource allocation information of other nodes.

18. The system as recited in claim 13, wherein the system is included on a node and the node allocates resources through the node with awareness of resource allocation information of other nodes consisting only of buffer sizes of neighboring nodes.

* * * * *